(12) United States Patent
Hamilton

(10) Patent No.: US 7,081,915 B1
(45) Date of Patent: Jul. 25, 2006

(54) CONTROL OF VIDEO CONFERENCING USING ACTIVITY DETECTION

(75) Inventor: Chris A. Hamilton, Montclair, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/587,990

(22) Filed: Jun. 6, 2000

Related U.S. Application Data

(63) Continuation of application No. 09/098,911, filed on Jun. 17, 1998, now abandoned.

(51) Int. Cl.
*H04N 7/14* (2006.01)

(52) U.S. Cl. .............................. 348/14.08; 348/14.12; 348/14.13

(58) Field of Classification Search ............ 348/14.01, 348/14.02, 14.07, 14.08, 14.09, 14.1, 14.12, 348/14.13; 379/202, 202.01; 709/204; 704/231, 704/260; 370/260–261; 382/100, 115, 118, 382/181, 282
See application file for complete search history.

(56) References Cited

U.S. PATENT DOCUMENTS

| 5,473,726 A | * | 12/1995 | Marshall | 250/221 |
| 5,512,939 A | * | 4/1996 | Zhou | 348/14.12 |
| 5,550,580 A | * | 8/1996 | Zhou | 348/14.1 |
| 5,572,261 A | * | 11/1996 | Cooper | 348/512 |
| 5,684,527 A | * | 11/1997 | Terui et al. | 348/14.09 |
| 5,745,161 A | * | 4/1998 | Ito | 348/14.09 |
| 5,771,306 A | * | 6/1998 | Stork et al. | 382/100 |
| 5,818,514 A | * | 10/1998 | Duttweiler et al. | 348/14.1 |
| 5,884,257 A | * | 3/1999 | Maekawa et al. | 704/248 |
| 5,914,747 A | * | 6/1999 | Hamilton | 348/14.08 |
| 5,953,050 A | * | 9/1999 | Kamata et al. | 348/14.09 |
| 6,313,864 B1 | * | 11/2001 | Tabata et al. | 348/14.02 |
| 6,369,846 B1 | * | 4/2002 | Katsumi | 348/14.01 |

FOREIGN PATENT DOCUMENTS

| EP | 254409 A1 | * | 1/1988 |
| JP | 03040177 A | * | 2/1991 |
| JP | 06-062400 | * | 3/1994 |
| JP | 06062400 A | * | 3/1994 |

* cited by examiner

*Primary Examiner*—Melur Ramakrishnaiah

(74) *Attorney, Agent, or Firm*—Blakely, Sokoloff, Taylor & Zafman LLP

(57) ABSTRACT

A video conferencing system employs a plurality of video conferencing stations, each of which includes a voice activity detector. When the images of remote conferees are displayed on a video conference station, the voice activity detection is utilized in order to designate which remote speaker is presently speaking.

5 Claims, 3 Drawing Sheets

CONTROL OF VIDEO CONFERENCING USING ACTIVITY DETECTION

RELATED APPLICATION

This is a continuation of application Ser. No. 09/098,911 filed Jun. 17, 1998, now abandoned.

TECHNICAL FIELD

This invention relates to video conferencing, and more specifically, to an improved technique of allowing various members of a video conference to identify which subset of a plurality of conference members are speaking at any time. In particular embodiments, items such as voice activity detection and image recognition software are used to automatically determine which of the conference members are speaking.

BACKGROUND OF INVENTION

Video conferencing is a technique utilized in order to provide both video and audio information from one or more users to a plurality of other users. Typically, a conference bridge is utilized to connect several participants of the video conference, and the signal received at the conference bridge from each conferee is broadcast to the other conference members. As a conferee uses the conference station, he/she views separate images from each of the other conference stations. FIG. 2 shows an example of a conference station as viewed by a conferee participating in a conference with four other conferees. As seen in FIG. 2, the video information from each of the four other conferees is displayed on a conference station video monitor, usually a personal computer. In this example, conferee 2 is missing, since it is the conference station of conferee 2 being viewed. Of course, a conferee may choose to see his own image on the screen.

Recently, much of the available conferencing technology is becoming focused on digital techniques. More specifically, with the availability of Internet access becoming less expensive and more widespread, it has become possible to implement the video conferences over the Internet or other similar data networks. Implementation of such conferences in the digital domain provides improved clarity, availability of compression techniques, etc. Additionally, with the price of personal computers getting lower and the speed of such computers increasing, it is possible to very inexpensively implement functions such as speech recognition, image processing, etc. Little advantage has been taken of the additional capabilities available in PC-based conference stations, and more particularly, of the ability of such conference stations to provide advanced signal processing functions.

There has been little research to date focused upon taking advantage of the additional capabilities of implementing video conferencing in the digital domain. Specifically, effective techniques which may reduce the confusion as to which participants in a video conference are speaking are not found in the prior art. In addition, the prior art does not utilize the combination of video and audio information for the purpose of voice activity detection.

SUMMARY OF THE INVENTION

The above and other problems of the prior art are overcome in accordance with the present invention which relates to an improved video conferencing system which provides for a technique of informing video conference members which subset of conference members are speaking at any given time. Technologies utilized include voice activity detection, speaker identification, and image recognition, or other such items.

DETAILED DESCRIPTION OF THE PREFERRED EMBODIMENT

Figure 1:
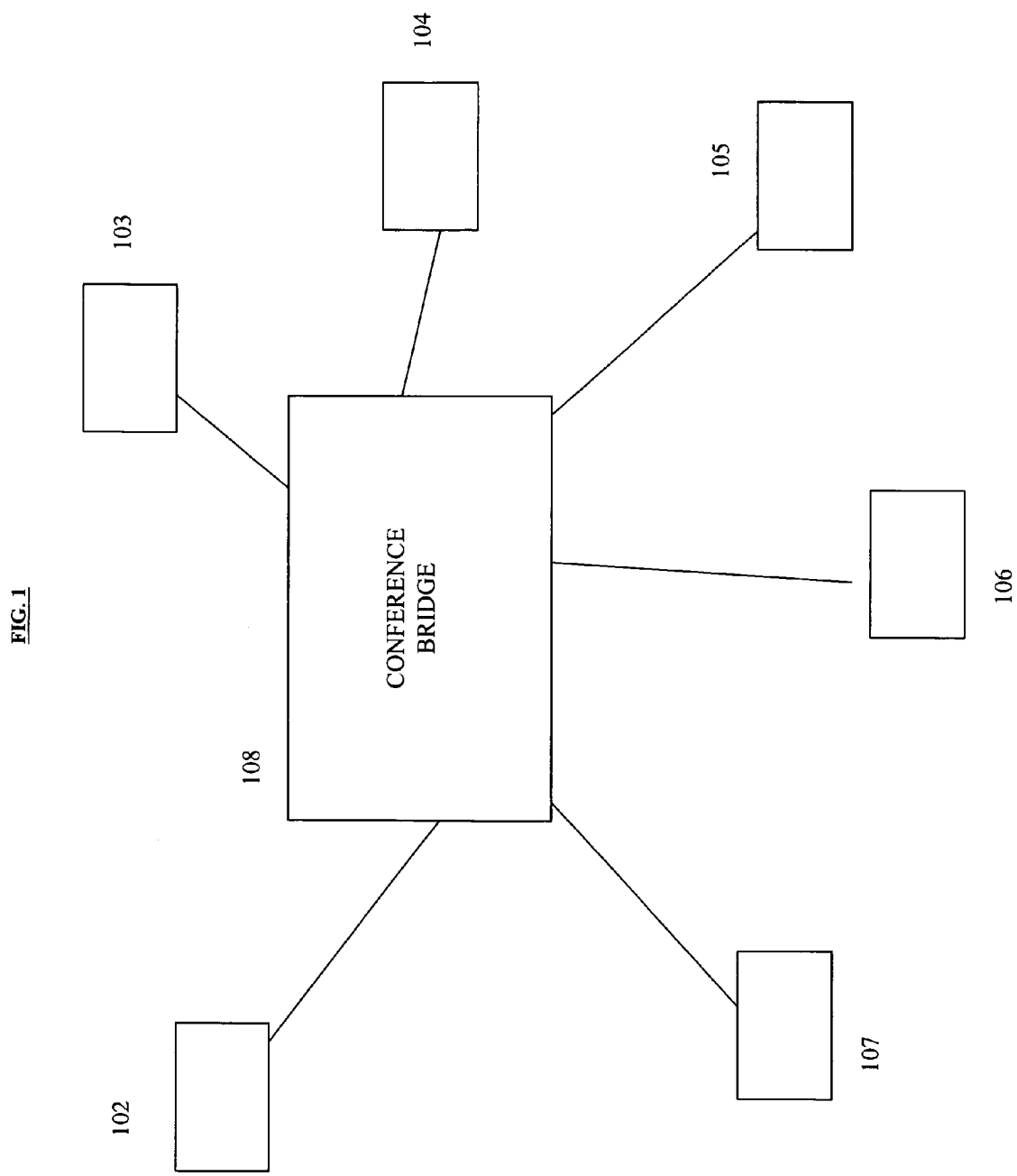
FIG. 1 shows a conceptual diagram of a video conferencing arrangement.

FIG. 1 shows a typical conference bridge arrangement for implementing a multi-party video conference. The arrangement shown in FIG. 1 includes a conference bridge 108 and a plurality of conference stations 102–107. The conference bridge 108 is implemented from well-known off the shelf components. The conference bridge 108 receives video signals from conference stations 102–107, and transmits to each conference station a signal indicative of the video and audio from all of the other conferencing stations.

In accordance with one embodiment of the present invention, a video conference speaker identification subsystem is utilized at each conference station 102–107 in order to allow conferees to more easily determine which of the conference members may be speaking at any time. Specifically, if the speaker identification subsystem located at, for example, conference station 102, detects or is informed that the person at conference station 103 is talking, then conference station 102 may act automatically in such a way as to inform the user at station 102 of this fact. Typically in multi-party conferences, a user will be presented at his conference station with the images of each of the other conference members as well as an monophonic mix of the audio source from each of the other conference stations. If many images are present on the conference station screen, then it may not be apparent who is speaking without a careful visual search of the screen images. In the present example, the conference member at station 102 would be presented with textual or graphic or other information informing him that the conferee at station 103 was speaking.

Figure 2:
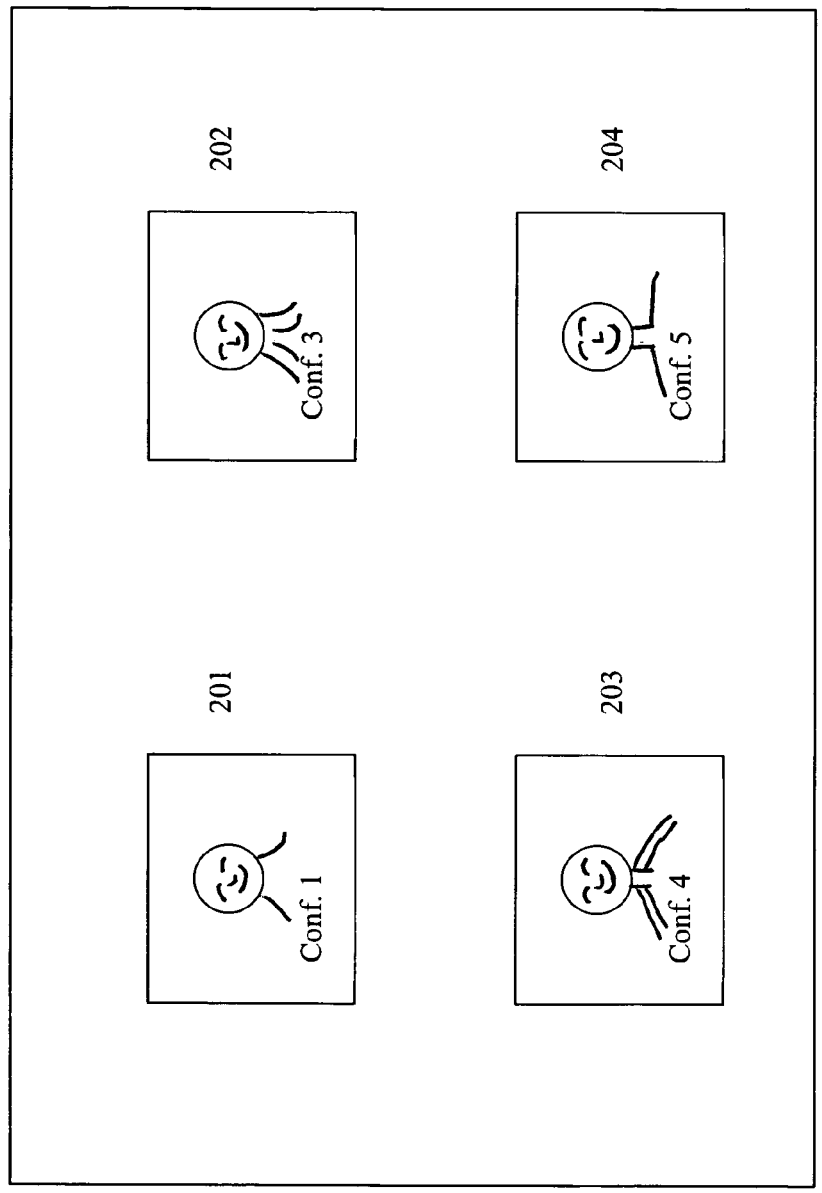
FIG. 2 depicts an exemplary video screen showing four conferees.

In one exemplary implementation, a voice activity detector is utilized in order to determine which of the conferees may be speaking at any time. Voice activity detectors are well known in the field of telecommunications and in the present invention could be implemented at the conference station or at the conference bridge server. In either case it would then be possible for the conference system to be able to differentiate those conferees who are speaking from those who are not. This differentiation can be useful. For example, the screen images of speaking conferees could be altered. Thus, for example, a border could be drawn around the image of any party speaking indicating to the other conferees that this image is the source of speech. Referring to FIG. 2, if conferee 201 begins speaking such that his voice is significantly louder than the other conferees, a bright border would appear around the image of conferee 201.

In an additional implementation, an improved voice activity detector (VAD) is utilized in order to determine which of the conferees may be speaking at any time. This improved VAD makes use of the audio signal as well as the video signal transmitted by a conference station. In particular, a traditional VAD is combined with image analysis and recognition software to improve the accuracy of the VAD. Image analysis and recognition techniques are well known in the field of image processing and may be employed here to analyze the image of a conference member to: (1) recognize the lips of within the image of the conferee and (2) to determine if the lips of the conferee are moving in a way that is reasonably consistent with the audio signal transmitted by the conference station. Thus, voice activity is detected when both audio and video components of the outgoing conference signal are consistent with human speech. Knowledge of such activity can be useful not only in allowing others within the conference to know which members are speaking, but also to save network bandwidth, etc.

Figure 3:
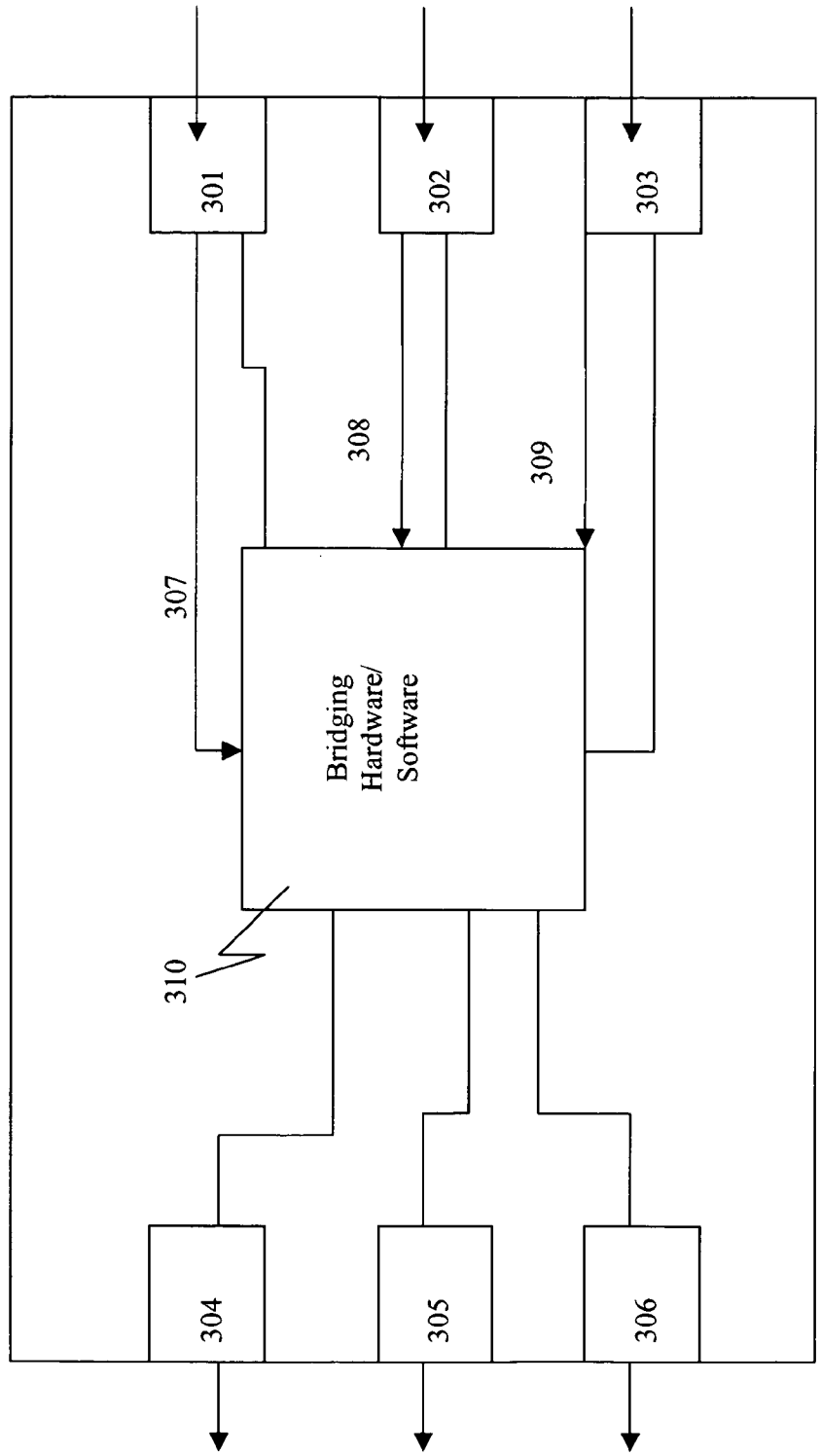
FIG. 3 depicts a slightly more detailed diagram of a conference bridge for use with the present invention.

FIG. 3 shows a slightly more detailed embodiment of the present invention comprising a plurality of receiving modules 301–303 and transmission modules 304–306. The exemplary simplistic arrangement of FIG. 3 is intended to conference three video conference stations together, with each transmission module 304–306 conveying to a conference station the two other conference station signals. Control lines 307–309 serve to activate and deactivate the functions previously discussed. For example, if it is determined that the received video stream from the conference station 301 is to be surrounded with a particular border, control line 307 instructs bridging hardware 310 appropriately. The bridging hardware 310 will then insert the border prior to placing the combined image for transmission on the appropriate two transmission modules 304–306.

The above describes the preferred embodiments of the invention. Various modifications and additions will be apparent to those of skill in the art.

What is claimed is:

1. A videoconferencing system comprising:
   a conference bridge for interconnecting a plurality of remotely located videoconferencing stations; and
   a speaker identification subsystem connected to the conference bridge to recognize a conferee's lips within the image of the conferee and to determine whether a conferee is speaking based, at least in part, on distinguishing the conferee's lips and lip movements from other image features in a digital video signal from a conference station at which the conferee is located and determining whether the lip movements are reasonably consistent with an audio signal from the conference station, the subsystem also to determine which of a plurality of conferees is speaking the loudest when multiple conferees are speaking simultaneously from different conference stations, the subsystem further to conserve network bandwidth.

2. The videoconference system of claim 1 wherein the speaker identification subsystem comprises a voice activity detector.

3. The videoconference system of claim 2 wherein said voice activity detector includes image analysis and recognition software.

4. The videoconferencing system of claim 1, further comprising:
   means for visually altering an image of said conferee displayed in other conference stations if said conferee is determined to be the loudest speaker of the plurality of conferees.

5. The videoconference system of claim 4 wherein said means for visually altering said image comprises means for highlighting a border around said image of said conferee determined to be the loudest speaker.

* * * * *